(12) United States Patent
Baker et al.

(10) Patent No.: US 9,185,848 B2
(45) Date of Patent: Nov. 17, 2015

(54) METHOD FOR ENHANCING GROWTH IN HORTICULTURAL PLANTS

(76) Inventors: George B. Baker, Junction City, OR (US); Clifford E. Fairchild, Corvallis, OR (US); Sheryl S. Webb, Creswell, OR (US)

( * ) Notice: Subject to any disclaimer, the term of this patent is extended or adjusted under 35 U.S.C. 154(b) by 303 days.

(21) Appl. No.: 13/563,550

(22) Filed: Jul. 31, 2012

(65) Prior Publication Data

US 2013/0031832 A1 Feb. 7, 2013

Related U.S. Application Data

(60) Provisional application No. 61/574,411, filed on Aug. 1, 2011.

(51) Int. Cl.
*A01G 1/00* (2006.01)
*A01G 7/04* (2006.01)

(52) U.S. Cl.
CPC ................ *A01G 1/001* (2013.01); *A01G 7/045* (2013.01)

(58) Field of Classification Search
CPC .............................. A01N 65/00; A01N 59/06
USPC ........................................... 47/58.1 R, 1.01 R
See application file for complete search history.

(56) References Cited

U.S. PATENT DOCUMENTS

| | | | | |
|---|---|---|---|---|
| 3,307,293 A | * | 3/1967 | Truax | 47/9 |
| 5,328,498 A | * | 7/1994 | Lang et al. | 71/64.07 |
| 6,027,740 A | * | 2/2000 | Puterka et al. | 424/405 |
| 6,110,867 A | * | 8/2000 | Glenn et al. | 504/119 |
| 6,420,361 B1 | * | 7/2002 | Baker et al. | 514/223.8 |
| 6,874,277 B2 | * | 4/2005 | Yamashita | 47/58.1 SC |
| 7,666,309 B1 | * | 2/2010 | Baker | 210/696 |
| 8,424,243 B1 | * | 4/2013 | Narciso et al. | 47/58.1 FV |
| 2008/0120900 A1 | * | 5/2008 | O'Neal et al. | 47/9 |
| 2010/0144534 A1 | * | 6/2010 | Pullen | 504/357 |

* cited by examiner

*Primary Examiner* — Kristen C Hayes
(74) *Attorney, Agent, or Firm* — Robert E. Howard

(57) ABSTRACT

A method for enhancing the growth of a horticultural plant comprising applying to the surface of the horticultural plant an effective amount of an ultrafine, dry ground calcite. The applied ultrafine, dry ground calcite transmits about 95% or greater, and reflects about 5% or less, of light in the PAR and UV wavelengths.

16 Claims, 2 Drawing Sheets

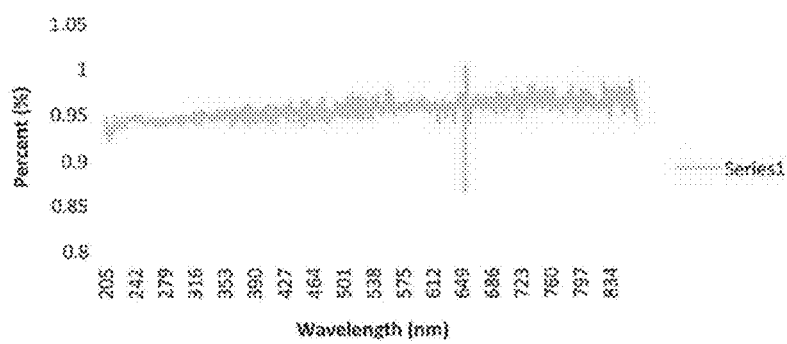
FIG. 1A Transmission
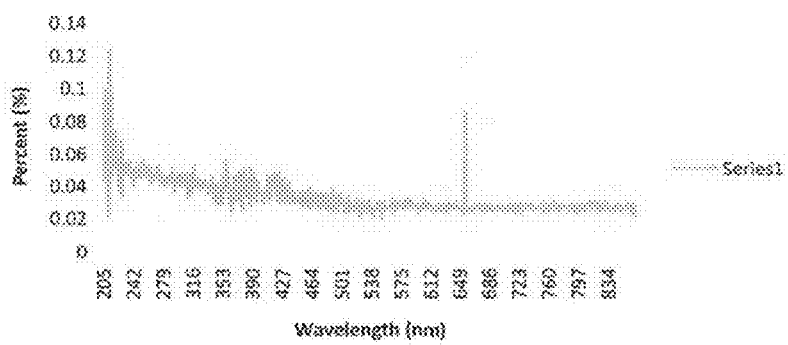
FIG. 1B Reflectance
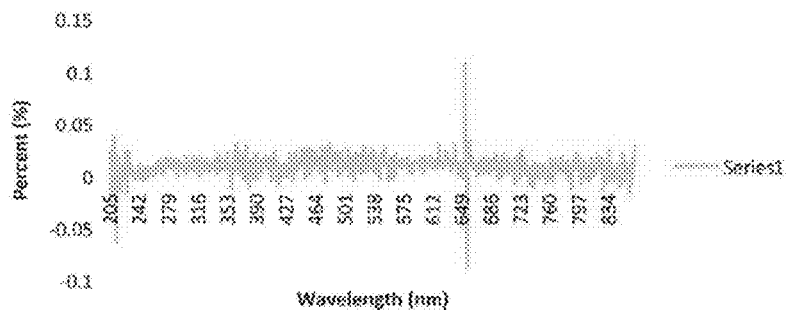
FIG. 1C Absorption

METHOD FOR ENHANCING GROWTH IN HORTICULTURAL PLANTS

CROSS-REFERENCE TO RELATED APPLICATIONS

This application claims the benefit of U.S. Provisional Patent Application No. 61/574,411 filed Aug. 1, 2011.

BACKGROUND OF THE INVENTION

The present invention relates to a method for enhancing growth in horticultural plants in sub-optimal light conditions by applying to the surface of the plant an effective amount of an ultrafine, dry ground, calcium carbonate derived from calcite. Ultrafine, dry ground, calcium carbonate derived from calcite has been found to exhibit high transmission and low reflectance of light in the photosynthetically active radiation ("PAR") and ultraviolet ("UV") wavelengths. It is generally accepted that PAR wavelengths are between 400 nm and 700 nm, and that UV wavelengths are between 10 nm and 400 nm. By "sub-optimal light conditions" is meant excess or insufficient sunlight for optimal photosynthesis.

At the higher end of sunlight exposure intensity excess sunlight can damage plant tissue through excess absorbence by the plant's photosynthetic pigments. When light intensity exceeds the light saturation point for photosynthesis, regardless of light type, photosynthetic pigments are damaged. Both the xanhophyll cycle and the antioxidant system of the plant provide some natural protective response to such photooxidative stress ("up-regulation"), but this natural up-regulation often does not provide enough protection against photooxidative damage. Damage to the oxygen evolving complex ("OEC") by high temperatures makes the photosystem II protein complex ("PSII") more sensitive to high light damage. Thus, the resulting damage caused by such excess sunlight causes a loss of chlorophyll production.

At the lower end of sunlight exposure intensity insufficient or low light intensity sunlight contributes to a loss of chlorophyll production.

U.S. Pat. No. 6,110,867 describes a method for providing enhanced photosynthesis of a horticultural crop "by increasing carbon dioxide assimilation." See the Reexamination Certificate issued under 35 U.S.C. 307 for this patent. The method comprises applying to the surface of the crops an effective amount of one or more "highly reflective" finely divided particulate material having a particle size of below about 3 microns. The useful particulate materials specified in this patent include calcium carbonate, mica, kaolin, bentonite, clays, pyrophyllite, silica, feldspar, sand, quartz, chalk, limestone, diatomaceous earth, baryle, aluminum trihydrate, titanium dioxide and mixtures thereof. These particulate materials are stated to be hydrophilic, but can be coated with a hydrophobic wetting agent to cause the hydrophilic core material to have a hydrophobic outer surface. However, as this patent admits, increasing the reflectivity of a plant's surface causes a reflection of PAR light which reduces photosynthesis. See column 1, lines 60-67.

SUMMARY OF THE INVENTION

A method for enhancing the growth of a horticultural plant by applying to the surface of the plant an effective amount of an ultrafine, dry ground, calcium carbonate derived from calcite that transmits 95% or greater, and reflects 5% or less, of light in the PAR and UV wavelengths.

It is under sub-optimal light conditions that ultrafine, dry ground, calcium carbonate derived from calcite provides its principal new horticultural crop benefit through its strong diffraction of transmitted sunlight. This strong diffraction provides excitation of a much larger fraction of available chlorophyll chromophores than does direct sunlight; and the resulting increase in photosynthesis is of significant benefit under both types of sub-optimal illumination.

The method of the present invention increases a plant's photosynthetic capacity and reduces photooxidative damage in plant surfaces.

In addition, the ultrafine, dry ground calcium carbonate derived from calcite used in the process of the present invention is believed to liberate carbon dioxide to the plant leaf interior since a fraction of the calcium carbonate equilibrates on the leaf surfaces into carbon dioxide and water.

BRIEF DESCRIPTION OF THE DRAWINGS

FIG. 1A is a graph of percent light transmission for ultrafine, dry ground, calcium carbonate derived from calcite for wavelengths ranging from 205 nm to 834 nm;

FIG. 1B is a graph of percent light reflectance for ultrafine, dry ground, calcium carbonate derived from calcite for wavelengths ranging from 205 nm to 834 nm;

FIG. 1C is a graph of percent light absorption for ultrafine, dry ground, calcium carbonate derived from calcite for wavelengths ranging from 205 nm to 834 nm.

DESCRIPTION OF PREFERRED EMBODIMENTS

Figure 2:
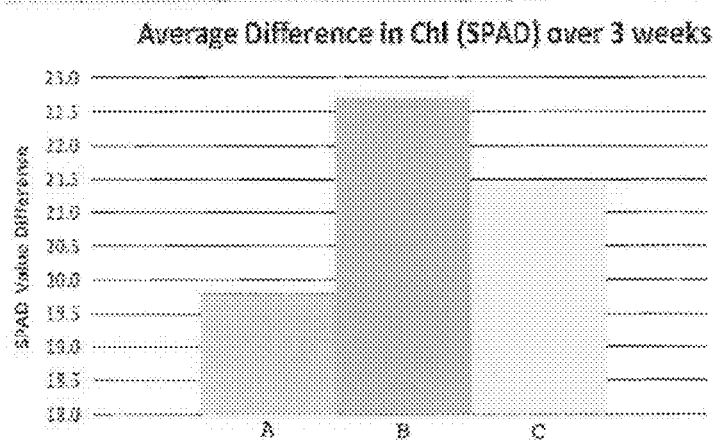
FIG. 2 is a bar chart of the increase in chlorophyll of rhododendron plants treated with a liquid slurry of ultrafine, dry ground, calcium carbonate derived from calcite compared to an untreated rhododendron plant.

This invention relates to a method for enhancing the growth of a horticultural plant by applying to the surface of the plant an effective amount of an ultrafine, dry ground, calcium carbonate derived from calcite that has high transmission and low reflectance of light in the PAR and UV wavelengths.

The horticultural plants to which the process of the present invention may be used to enhance photosynthesis are agricultural and ornamental plants, such as fruits, vegetables, trees, flowers, grasses, bulbs, seedlings and landscape plants.

Not all calcium carbonates are useful in practicing the present invention. The properties required of the calcium carbonate useful in practicing the present invention are fairly specific.

Of the three natural polymorphs of calcium carbonate, i.e., calcite, aragonite and vaterite, only the calcite polymorph is useful in practicing the present invention. Calcite has a rhombohedral crystalline structure whereas aragonite has an orthorhombic crystalline structure and vaterite has a hexagonal crystalline structure.

The particle size of the calcium carbonate useful in practicing the present invention is "ultrafine", i.e., has a particle size ranging between about 400 nm to about 1,000 nm, preferably ranging between about 400 nm to about 900 nm, and most preferably ranging between about 400 nm to about 700 nm. Particle size was measured using a Mastersizer Microplus Ver. 2.19 analyzer and verified by SEM photography conducted at Oregon State University, Corvallis, Oreg.

Typically particulate calcium carbonate is either formed by a wet ground process or a precipitation process. The calcite limestone used to form the particulate calcium carbonate useful in the present invention is dry ground by subjecting the limestone to the comminution action of steel spheres in a ball mill that act as a combination of millstones and hammers to reduce the size of the limestone to a fine powder. The comminuted powder is then air classified to sort out and retain those ultrafine particles meeting the particle size criteria discussed above. Forming a powder by wet grinding or precipitation does not provide an ultrafine calcium carbonate useful for practicing the present invention.

To distinguish the calcium carbonate useful in practicing the present invention from other, non-useful calcium carbonates, the calcium carbonate useful in practicing the present invention will be referred to herein as ultrafine, dry ground calcite, or UFDGC. Exemplary UFDGCs useful in practicing the present invention are those supplied by IMASCO Minerals Inc. of British Columbia, Canada, under the gradations "10HX" and "11HX" (corresponding to the Hegman scale).

Unlike the particulate materials useful in practicing the process described in U.S. Pat. No. 6,110,867 which must be "highly reflective" of sunlight, the UFDGC particles of the present invention have very low reflectance. The UFDGC particles of the present invention are highly light transmitting, transmitting about 95% or greater of light in the PAR and UV wavelengths and reflecting only about 5% or less of the light in the PAR and UV wavelengths. See FIGS. 1A and 1B.

FIG. 1A shows the percentage of light transmitted by UFDGC particles over wavelengths ranging from 205 nm to 834 nm, i.e., ultraviolet through infrared.

FIG. 1B shows the percentage of light reflected by UFDGC particles over the same wavelength range.

FIG. 1C shows that only about 1% to about 3% of light over the same wavelength range is absorbed which means that potentially plant damaging high levels of absorption of PAR wavelengths is not caused by treatment with UFDGC.

The transmission, reflection, and absorption data shown in FIGS. 1A-1C were obtained using an integrating sphere manufactured by Orb Optronix. The test method illuminates from one direction and uses an integrating sphere to collect and detect all of the transmitted, reflected, or absorbed light.

UFDGC particles possess the optical phenomena known as birefringence (uniaxial) and diffraction. Birefringence within a UFDGC particle splits an incident light ray into two linearly polarized refracted rays and the UFDGC particle then diffracts outgoing waves. UFDGC is very effective in the diffraction of PAR sunlight because the particle sizes of the transparent birefringent microcrystals of UFDGC are approximately the same as the wavelengths of PAR sunlight. The cumulative effect of a large number of UFDGC particles is that light waves are diffracted in all directions, mimicking diffuse sunlight as in the lower canopy light of plants. The diffracted PAR and UV light is able to excite plant chromophores exposed to but left dormant (unexcited) by direct sunlight, thereby causing an increase in photosynthesis. Also, diffracted PAR light illuminates and excites plant chlorophyll chromophores which are hidden from direct sunlight by plant architecture.

In addition, the more energy that goes into enhancing photosynthesis by virtue of treating plants with the process of the present invention, the less energy that goes into heat production that would raise the plant's temperature which can be detrimental to photosynthesis.

In total, less sunlight is converted to heat and more chloroplasts are evenly illuminated which helps maintain photosynthesis under suboptimal light conditions.

The UFDGC compositions of the present invention are applied to plants to be treated as an aqueous slurry by spraying the plant surfaces one or more times during their growing season. In addition to UFDGC, the aqueous slurry may contain other formula adjuvants to improve spread and particle leaf alignment, and to stabilize the mix solution.

The UFDGC in the UFDGC aqueous slurry composition is present in the amount of between about 1% and about 4% by weight, preferably in the amount of between about 2% and about 4% by weight, and most preferably in the amount of about 2% by weight.

The aqueous slurry composition containing the UFDGC is preferably applied to a crop in an amount of between about 1 and about 4 gallons of slurry per 100 gallons of water for ground spray, and between about 1 and about 4 gallons of slurry per 20 gallons of water for aerial spray.

The effective amount of the UFDGC composition to be applied to a particular crop to enhance its growth can be easily determined by one having ordinary skill in the art. An "effective" amount of the UFDGC composition is an amount that enhances photosynthesis. Photosynthesis in a plant is considered to be "enhanced" when there is an increase in chlorophyll production over that obtained in an untreated plant grown under substantially the same conditions, as measured by chlorophyll meters such as: a Minolta SPAD Chlorophyll meter (Spectrum Technologies Inc., Plainfield, Ill. 60685); a Ping meter (Precision Plant Systems inc., Corvallis, Oreg. 97333); or an Atleaf meter (FT Green LLC, Wilmington, Del. 19801.

Unlike the crop treatment with the compositions described in U.S. Pat. No. 6,110,867 which leaves the plant surface with a white appearance (column 5, lines 1-2), the surface of plants treated by an effective amount of the UFDGC compositions of the present invention appears lightly dusted, generally requiring less than about 50% coverage of the plant's surface to be effective. Over-application to the level suggested by U.S. Pat. No. 6,110,867 (i.e., to the level of a white appearance) is detrimental to the present invention.

U.S. Pat. No. 6,110,867 claims an increase in carbon dioxide ($CO_2$) assimilation. When evaluating carbon dynamics [atmospheric, intercellular, and mesophyllical], it is important to distinguish the amount of carbon that can potentially be fixed from the actual amount of carbon that is fixed, just as gross photosynthesis is different from the net photosynthesis.

In darkness, leaves are net producers of $CO_2$ as a result of mitochondrial respiration. (Atkin, 1998). In the daytime, leaves assimilate $CO_2$ and carbon fixation profiles correlate directly to light absorption profiles in leaves. Carbon fixation follows gradients of absorbed light into the leaf, not light reflected away from the leaf. (Evans, Australian journal of Plant Physiology 22(6) pages 865-873)

Epidermal cells intensify and focus available light into the chloroplasts where photosynthesis takes place. Additionally, leaves can have more intracellular light due to intercellular reflection, increasing the chance of photons hitting chloroplasts due to the many diffused angles. (Haberlandt, Physiological Plant Anatomy, pages 120-121). Likewise, all else being equal, diffuse light is absorbed more efficiently by a chloroplast than is a collimated light (Richter, T. and Fukshansky, L. F. 1994 Photochem Photobiol Vol 59 pg 237-247).

Carbon fixation is increased because this invention supplies more diffuse light entering the leaf which causes the photons of light to reach more dormant chromophores (the light absorption molecules of the chloroplasts), which augments the carbon fixation, which in turn yields more chlorophyll production as seen in Example 2 below.

The second reason this invention enhances carbon fixation is due to the following chemical formula which gives rise to the $CO_2$ sequestration on the leaf surface at any time there is moisture and evaporation:

$$(Ca)CO_3 + H_2O + CO_2 \ll (Ca)(HCO_3)_2$$

The reaction water for this formula is supplied by dew, irrigation, rainfall, and/or plant respiration.

Leaves can photosynthesize more when available atmospheric $CO_2$ increases. (Sherwood B. Idso and Bruce A. Kimball, Plant Physiol. (1992) 99, 341-343 & ELIZABETH A. AINSWORTHI, ALISTAIR ROGERS, *Plant, Cell and Environment* (2007) 30, 258-270) This sequestered $CO_2$ functions like a symbiont providing a reservoir of additional $CO_2$ on the leaf surface which increases chlorophyll production.

In Example 2 below, increased chlorophyll production was witnessed and measured by three different testing devices (Minolta SPAD Chlorophyll meter; a Ping meter; and an Atleaf meter). Plants were gown in a non-heated greenhouse during the winter at Corvallis; Oreg. (45 degrees North Latitude). Even so, the chlorophyll increased due to diffused light and sequestered $CO_2$ on the leaf surfaces.

Again carbon fixation is not the same as $CO_2$ assimilation. With the calcium carbonate of the present invention there is no appreciable increase of $CO_2$ assimilation over an untreated control.

The following examples are illustrative of various aspects of the present invention, but are not intended to limit the scope of the invention as set forth in the claims appended hereto.

Example 1

Preparation of a UFDGC Containing Composition

Potable water in the amount of 800 gallons was added to a high shear mixer. Agitation was commenced and the following ingredients were added in the following order:
Lecithin: 464 pounds (until dispersed)
Sodium Carbonate: 55 pounds (until dissolved)
UFDGC (Imasco 10HX): 11,324 pounds (while mixing)
Clove Oil: 31.5 pounds
Guar Gum: 20.4 pounds The resulting suspension was subjected to deaeration to form an aqueous suspension of UFDGC having a weight percent of about 60% by weight.

Example 2

Treatment of Rhododendron Plants with a UFDGC Composition

Dormant *Roseum elegans* rhododendrons growing in one gallon plastic containers were obtained. The adaxial (upper) leaf surfaces of one set of the plants was sprayed with water; the adaxial leaf surface of a second set of plants was sprayed with a 2% UFDGC aqueous suspension prepared from the concentrate of Example 1, and the adaxial leaf surface of a third set of plants was sprayed with a 4% UFDGC aqueous suspension prepared from the concentrate of Example 1. After drying, the plants were placed under supplemental lighting (high pressure sodium vapor lamps) in a temperature controlled glasshouse. The plants were fertilized with complete liquid fertilizer and watered as needed. Each spray treatment was replicated 15 times and completely randomized on the greenhouse bench. The plants were monitored weekly for greenness of the previous season leaves with three plant meters: a Minolta SPAD Chlorophyll meter; a Ping meter; and an Atleaf meter. All three meters showed that the greenness (relative chlorophyll content) of the leaves were greatest in the 2% UFDGC treatment followed by the 4% and water control, respectively. FIG. 2 is a graph showing the average difference in chlorophyll after three weeks as measured by the SPAD meter. After four weeks the percentage of buds with new leaves unfolding from plants treated with water, 2% UFDGC and 4% UFDGC were 10%, 54%, and 43%, respectively. In general, the plants treated with UFDGC were noticeably more vigorous, particularly at the 2% application rate.

Example 3

Leaf Temperature Impact

Two rose bushes, three rhododendrons, and three English laurels located outdoors in Corvallis, Oreg., were selected for testing. The roses, rhododendrons, and the largest of the English laurels were all mature plants, more than ten years old. Two of the English laurels were potted, and they were moved during each day of the test period to maximize their exposure to full sunlight. Commencing on May 15, 2% and 4% by weight aqueous suspensions of UFDGC were sprayed on selected leaves of all of the plants; about half of the leaves were left untreated for use as controls. Leaf temperatures were measured using non contact infrared (IR) sensing thermometers at one hour intervals on clear days. The IR sensors used were Exergen Model iRt/c.07 devices. For data acquisition, the IR sensors were connected to data loggers, and the data logger contents were subsequently downloaded to a personal computer. The data loggers and software were HOBO data loggers purchased from MicroDAQ of Contoocook, N.H. On a typical clear day leaf temperature measurements began at approximately 10:00 AM, and continued at one hour intervals until approximately 6:00 PM. Over the course of the summer, maximum clear day temperatures were approximately in the range of 80-100 degrees F. After each of the light rains which occurred during May, June and July, a fresh coating of UFDGC was applied in the concentrations and to the same leaves described above. In addition to water supplied by rain, all plants were irrigated as needed to maintain adequate hydration. The last measurable rain during the trial period occurred on July 10. On July 14 a fresh coat of UFDGC was applied as described above. No additional coatings were applied during the trial period. By late August it was visually apparent that the coated rhododendron leaves were in better health than the control leaves. A significant fraction of untreated leaves showed evidence of sunburn, whereas all coated leaves remained in good health, with no evidence of sunburn. The data in the following table are representative of the temperature measurements made during the time period described above. Each temperature listed is an average of eleven temperature measurements. For plant leaves coated with a 2% solution of UFDGC no significant temperature differences were measured for the three different types of plants tested: therefore, the temperatures listed in the table are representative for all three types of plants, with a 2% solution applied to each type. Data for coating with a 4% solution were similar to those listed in the table, but with a larger scatter in the numbers. All temperatures are in degrees Fahrenheit.

| Air Temperature | Treated Leaf Temperature | Untreated Leaf Temperature |
| --- | --- | --- |
| 82 | 88 | 93 |
| 89 | 93 | 99 |
| 95 | 100 | 106 |

The heat stress protection provided by UFDGC is apparent. At an air temperature near 70 degrees F. the temperatures of treated and untreated leaves are roughly the same as ambient air temperature. In contrast, for temperatures above 80 degrees F., the UFDGC coating provides a significant reduction in plant temperature.

In addition to enhancing plant growth, treatment of horticultural plants with a UFDGC composition in accordance with the present invention can provide other benefits. For example, it has been found that treatment of a pome fruit crop, such as apples and pears, can reduce the incidence of storage scald.

Another aspect of the present invention is the addition of clove oil to the composition to be applied to plants to enhance growth. The stoma or pores found in the leaf and stem epidermis of a plant is used for gaseous exchange. The pore is bordered by a pair of specialized (parenchyma) cells known as guard cells that are responsible for regulating the size of the opening. The term "stomata" is used collectively to refer to an entire stomatal complex, both the pore itself and its accompanying guard cells. Air containing carbon dioxide and oxygen enters the plant through these openings where it is used in photosynthesis and respiration, respectively. Oxygen produced by photosynthesis in the spongy layer cells (parenchyma cells with pectin) of the leaf interior exits through these same openings. Also, water vapor is released into the atmosphere through these pores in a process called transpiration. Since carbon dioxide enters the leaf through the same stomata that water vapor exits, plants cannot gain carbon dioxide without simultaneously losing water vapor. It has been found that the presence of clove oil in the compositions of the present invention applied to plants induces stomatal closure, thereby decreasing transpiration to prevent water loss. It is the terpenoid (abscisic acid) present in clove oil, which constitutes about 72% to about 90% of the total composition of the essential oil extracted from cloves, which induces stomatal closure. The amount of clove oil used in the compositions of the present invention is that amount which is effective to induce stomatal closure sufficiently to reduce transpiration without substantially harming the plant. Such an effective amount is between about 0.2% and about 2.0% by weight of the composition.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A method for enhancing the growth of a horticultural plant comprising applying to the surface of said horticultural plant an effective amount of a dry ground calcite having a particle size effective to transmit about 95% or greater of light in the PAR and UV wavelengths and reflect about 5% or less of light in the PAR and UV wavelengths, said dry ground calcite being applied to the surface of said plant at a level that provides less than about 50% coverage of the plant's surface.

2. The method of claim 1 wherein said dry ground calcite has a particle size ranging between about 400 nm and about 1,000 nm.

3. The method of claim 1 wherein said dry ground calcite has a particle size between about 400 nm and about 900 nm.

4. The method of claim 1 wherein said dry ground calcite has a particle size between about 400 nm to about 700 nm.

5. The method of claim 1 wherein said dry ground calcite is applied to the surface of a plant as an aqueous slurry.

6. The method of claim 5 wherein said dry ground calcite is present in said aqueous slurry in an amount of between about 1% and about 4% by weight.

7. The method of claim 5 wherein said aqueous slurry contains an amount of clove oil effective to decrease transpiration.

8. The method of claim 7 wherein said clove oil is present in said aqueous slurry in an amount of between about 0.2% and about 2.0% by weight.

9. The method of claim 5 wherein said aqueous slurry contains lecithin dispersed therein.

10. The method of claim 9 wherein said aqueous slurry contains sodium carbonate dissolved therein.

11. The method of claim 1 wherein said particle size of said dry ground calcite is effective to limit light absorbed by said dry ground calcite to between about 1% and about 3% of light in the PAR and UV wavelengths.

12. A method for enhancing the growth of a horticultural plant comprising applying to the surface of said horticultural plant an effective amount of a dry ground calcite having a particle size effective to transmit about 95% or greater of light in the PAR and UV wavelengths and reflect about 5% or less of light in the PAR and UV wavelengths, and is effective to limit light absorbed by said dry ground calcite to between about 1% and about 3% of light in the PAR and UV wavelengths, said dry ground calcite being applied as an aqueous slurry containing lecithin and sodium carbonate, said dry ground calcite being applied to the surface of said plant at a level that provides less than about 50% coverage of the plant's surface.

13. The method of claim 12 wherein said dry ground calcite has a particle size between about 400 nm and about 1,000 nm.

14. The method of claim 12 wherein said dry ground calcite is present in said aqueous slurry in an amount of between about 1% and about 4% by weight.

15. The method of claim 12 wherein said aqueous slurry contains an amount of clove oil effective to decrease transpiration.

16. The method of claim 15 wherein said aqueous slurry contains clove oil in an amount of between about 0.2% and about 2.0% by weight.

* * * * *